United States Patent
Koito et al.

(10) Patent No.: US 11,194,172 B2
(45) Date of Patent: Dec. 7, 2021

(54) DISPLAY DEVICE AND DISPLAY METHOD

(71) Applicants: Japan Display Inc., Minato-ku (JP);
NHK Technologies, Inc., Shibuya-ku (JP)

(72) Inventors: Takeo Koito, Tokyo (JP); Shuji Hayashi, Tokyo (JP); Teijiro Otsuka, Tokyo (JP)

(73) Assignees: Japan Display Inc., Minato-ku (JP); NHK Technologies, Inc., Shibuya-ku (JP)

( * ) Notice: Subject to any disclaimer, the term of this patent is extended or adjusted under 35 U.S.C. 154(b) by 208 days.

(21) Appl. No.: 16/204,587

(22) Filed: Nov. 29, 2018

(65) Prior Publication Data
US 2019/0187484 A1 Jun. 20, 2019

(30) Foreign Application Priority Data
Oct. 23, 2017 (JP) .............................. JP2017-204701

(51) Int. Cl.
*G02B 30/00* (2020.01)
*G02B 30/27* (2020.01)
*G02F 1/1335* (2006.01)

(52) U.S. Cl.
CPC ........ *G02B 30/27* (2020.01); *G02F 1/133512* (2013.01); *G02F 1/133526* (2013.01); *G02F 2201/52* (2013.01)

(58) Field of Classification Search
CPC ........ G02B 30/00; G02B 30/27; G02B 30/20; G02B 30/22; G02B 30/26; G02B 30/28;
(Continued)

(56) References Cited

U.S. PATENT DOCUMENTS 6,064,424 A 5/2000 van Berkel et al.
7,898,602 B2 * 3/2011 Yabuta ................. G09G 3/3611
349/1

(Continued)

FOREIGN PATENT DOCUMENTS

JP 2005-316372 11/2005
JP 2014-85663 5/2014
JP 5838228 B2 1/2016

OTHER PUBLICATIONS

Office Action dated Apr. 6, 2021, in Japanese Patent Application No. 2017-204701 (Machine Translation).
(Continued)

*Primary Examiner* — Stephone B Allen
*Assistant Examiner* — Jyotsna V Dabbi
(74) *Attorney, Agent, or Firm* — Oblon, McClelland, Maier & Neustadt, L.L.P.

(57) ABSTRACT

A display device includes a display portion including sub-pixels, and a light control portion overlapping the display portion. The display portion includes a red sub-pixel, a green sub-pixel, and a blue sub-pixel, each of the red sub-pixel, the green sub-pixel, and the blue sub-pixel is shaped in a parallelogram, and inclined at a first angle of greater than or equal to 4° and less than or equal to 16° with respect to the second direction. The light control portion is inclined at a second angle substantially equivalent to arctan (2/9) with respect to the second direction.

3 Claims, 11 Drawing Sheets

(58) Field of Classification Search
CPC ........ G02B 30/29; G02B 30/30; G02B 30/31; G02B 30/32; G02F 1/133512; G02F 1/133526; G02F 1/133514; G02F 2201/52; G02F 2201/12; G02F 2201/123; H04N 13/302; H04N 13/305; H04N 13/307; H04N 13/317; H04N 13/31; H04N 13/30; H04N 13/349; H04N 13/351; G09G 2320/0233
USPC ...... 359/462–464, 466; 348/42–60; 353/7–9; 349/8–9, 15
See application file for complete search history.

(56) References Cited

U.S. PATENT DOCUMENTS

| | | |
|---|---|---|
| 2009/0015732 A1 | 1/2009 | Yabuta et al. |
| 2011/0242289 A1* | 10/2011 | Fukushima .......... H04N 13/354 348/51 |
| 2012/0062990 A1 | 3/2012 | Okamoto |
| 2013/0242386 A1* | 9/2013 | Koito .................... H04N 13/31 359/464 |
| 2014/0002897 A1 | 1/2014 | Krijn et al. |
| 2014/0118412 A1 | 5/2014 | Lee et al. |
| 2014/0192047 A1* | 7/2014 | Mishima ................ G02B 30/27 345/419 |
| 2015/0035872 A1 | 2/2015 | Shima et al. |
| 2015/0070476 A1 | 3/2015 | Wei |

OTHER PUBLICATIONS

Office Action dated May 11, 2021, in Japanese Patent Application No. 2017-204701 (Machine Translation).

* cited by examiner

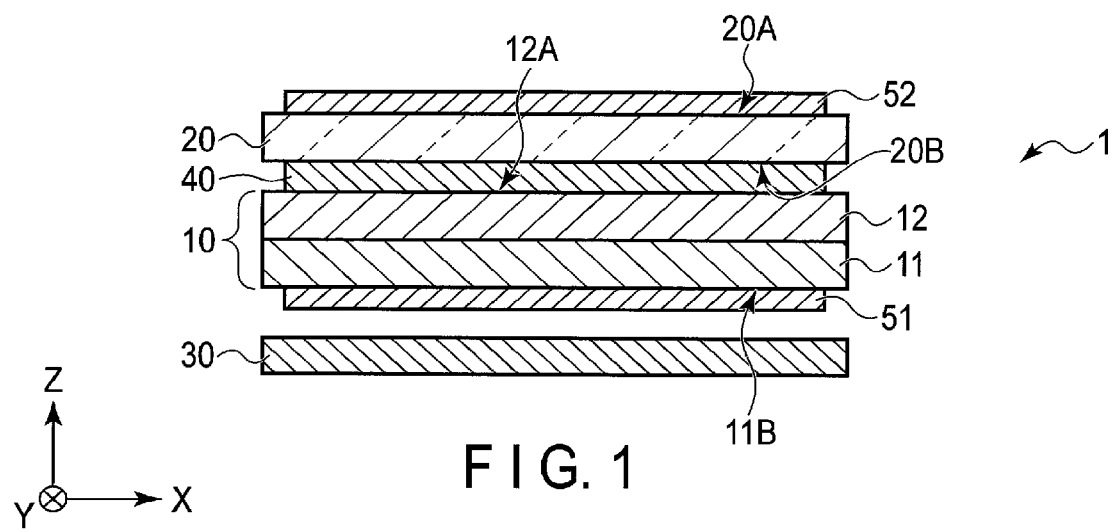
F I G. 1
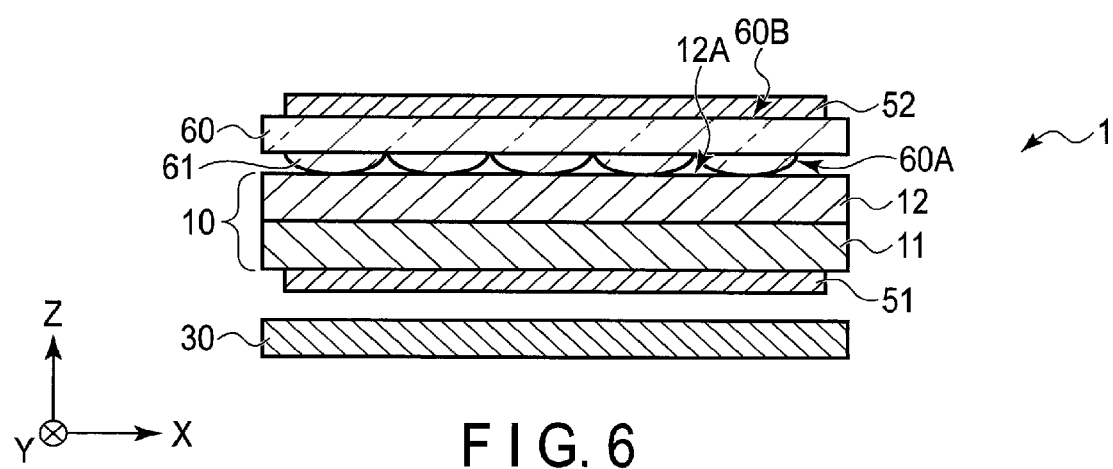
F I G. 6

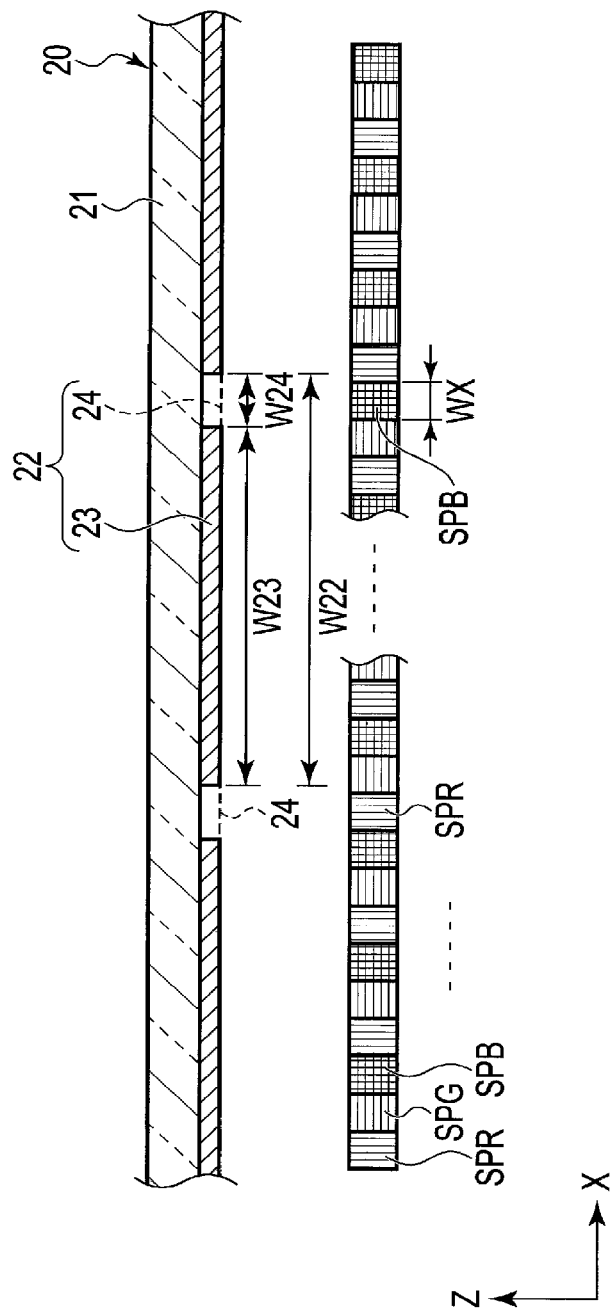
F I G. 3

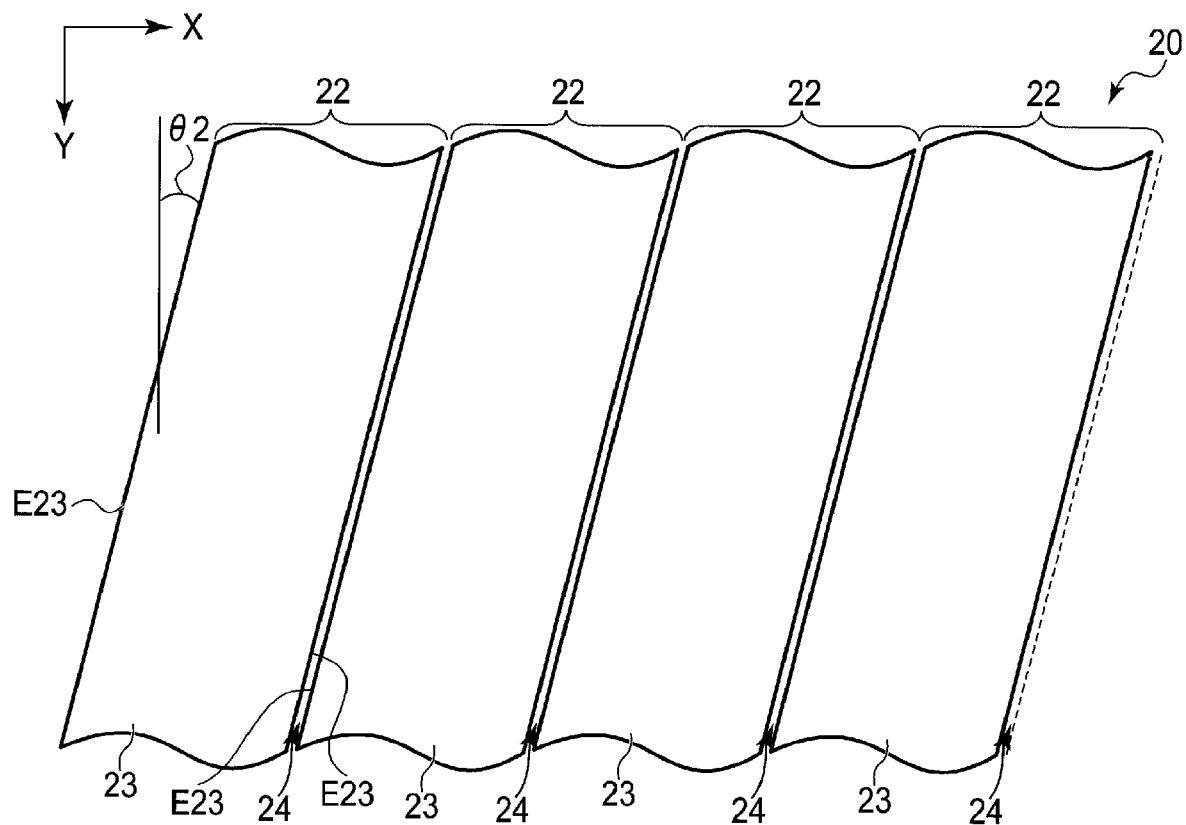
F I G. 4
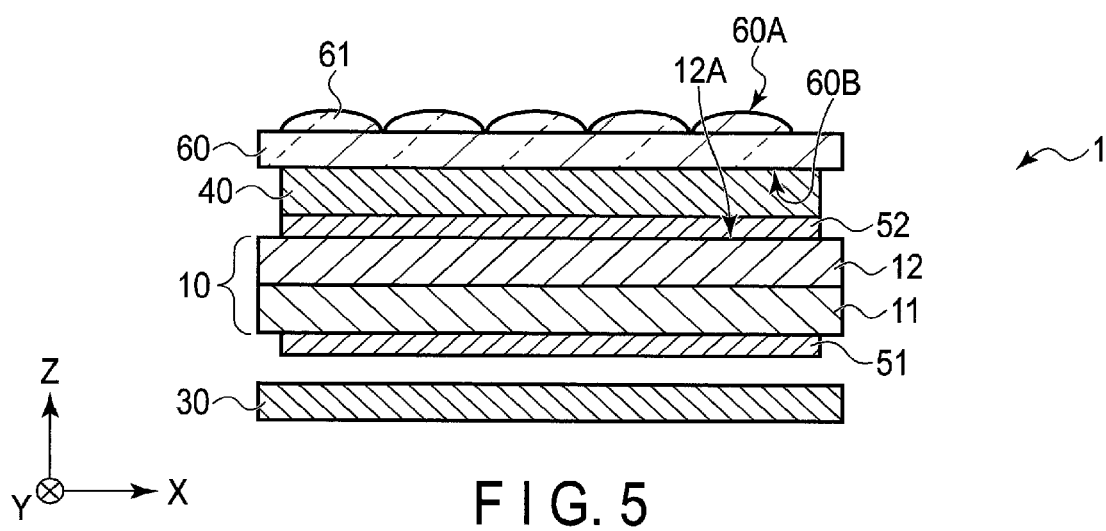
F I G. 5

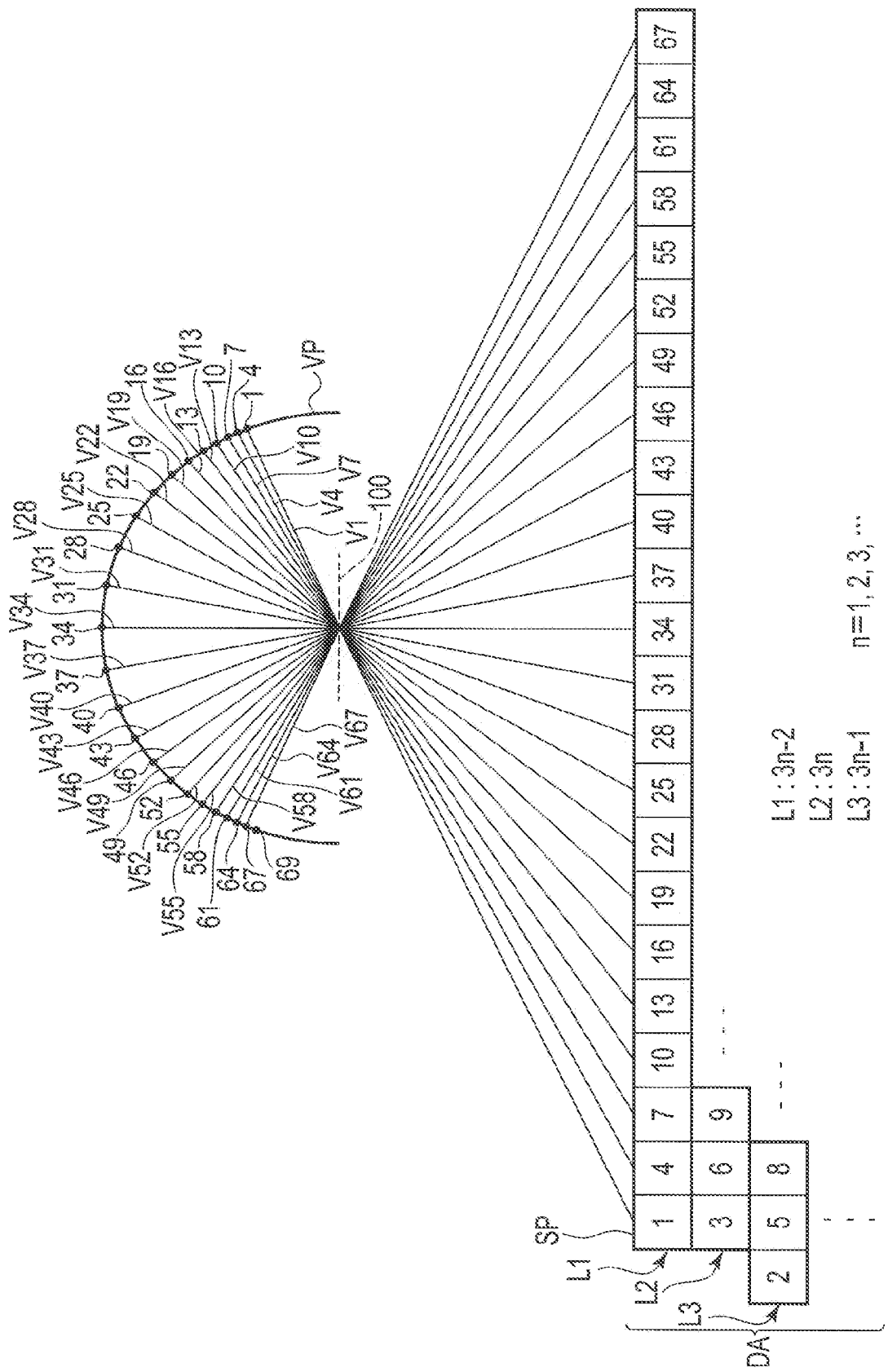
F I G. 10

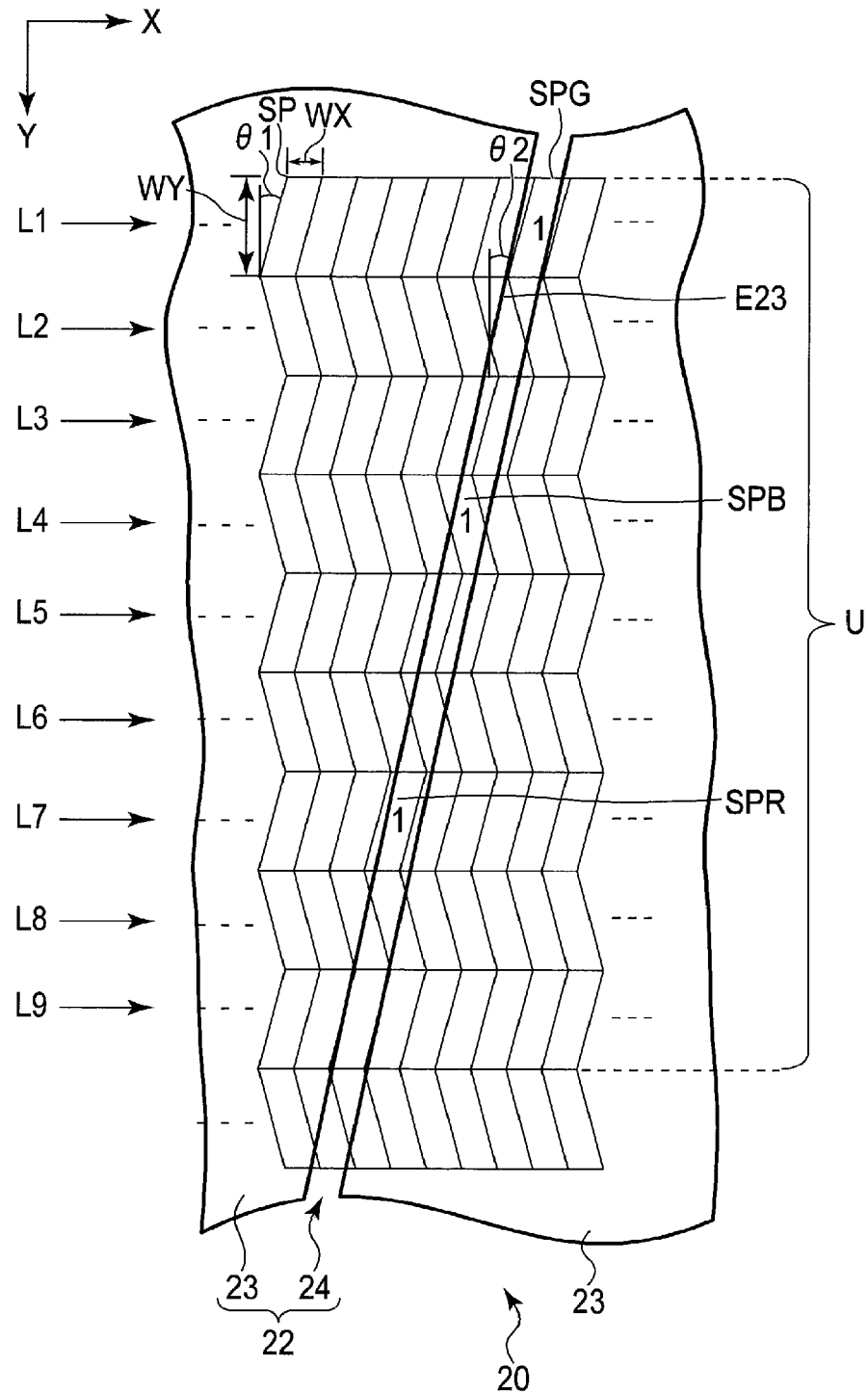
F I G. 11

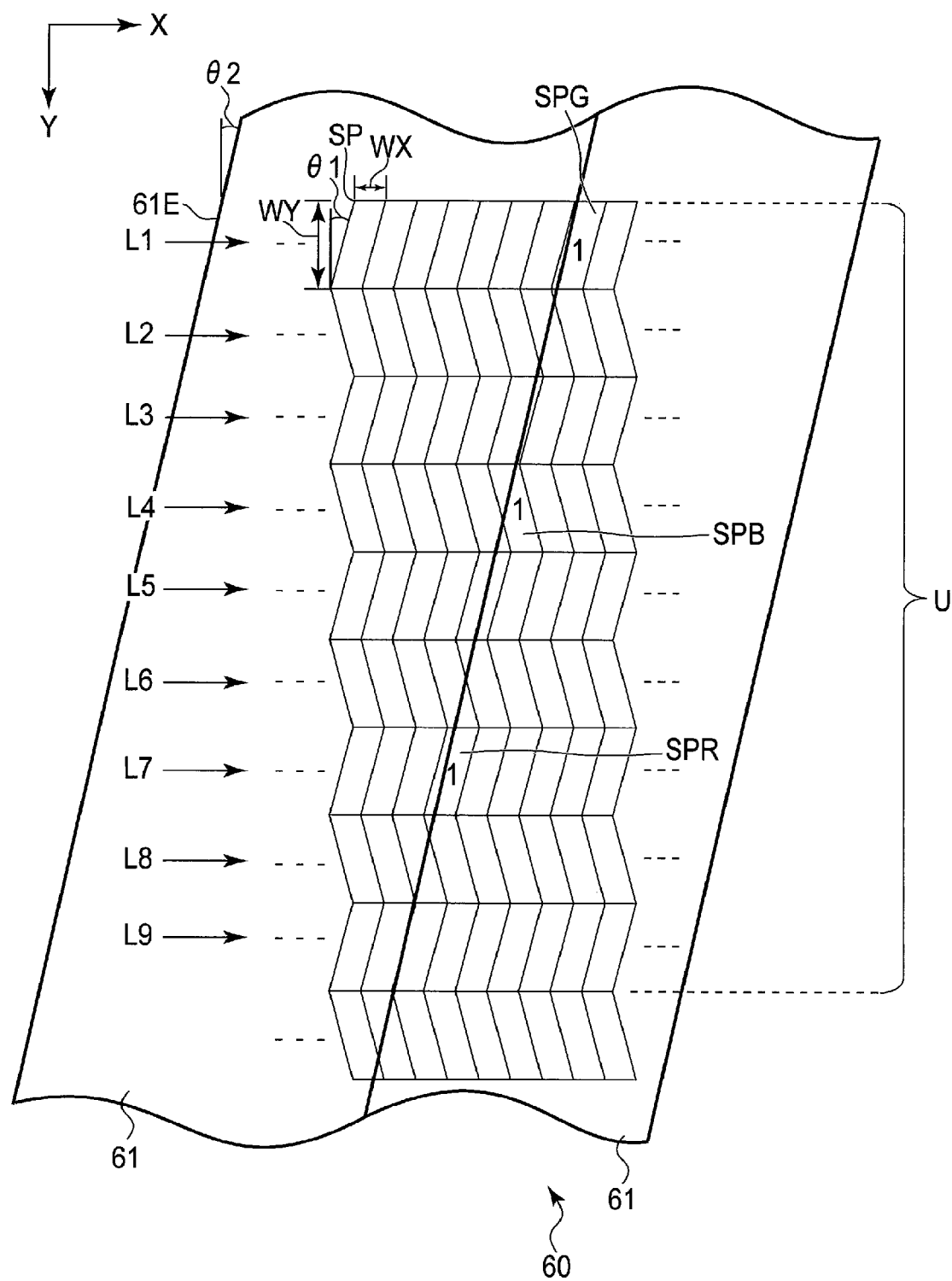
F I G. 12

<Comparative example>

<Embodiment>

DISPLAY DEVICE AND DISPLAY METHOD

CROSS-REFERENCE TO RELATED APPLICATIONS

This application is based upon and claims the benefit of priority from Japanese Patent Application No. 2017-204701, filed Oct. 23, 2017, the entire contents of which are incorporated herein by reference.

FIELD

Embodiments described herein relate generally to a display device and a display method.

BACKGROUND

Recently, various display devices enabling stereoscopic view with the naked eyes have been proposed. In such display devices, achieving more natural stereoscopic view is required. In one example, a technology of combining a display panel, which simultaneously displays multiple images different from each other in a horizontal direction, and a lenticular lens has been known. According to this technology, when a viewer observes the display panel through the lenticular lens, images observed when a viewpoint is changed horizontally are switched, and a motion parallax can be obtained.

BRIEF DESCRIPTION OF THE DRAWINGS

FIG. 1 is a cross-sectional view showing a first configuration example of a display device 1 of the present embodiment.

FIG. 3 is a cross-sectional view showing a configuration example of a light control device 20 shown in FIG. 1.

FIG. 4 is a plan view showing a configuration example of the light control device 20 shown in FIG. 3.

FIG. 5 is a cross-sectional view showing a second configuration example of the display device 1 of the present embodiment.

FIG. 6 is a cross-sectional view showing a third configuration example of the display device 1 of the present embodiment.

FIG. 10 is an illustration showing the relationship between a viewpoint in a virtual observation plane VP and the sub-pixels SP to be observed.

FIG. 11 is a plan view showing the sub-pixels SP to be observed from viewpoint 1 when light restriction elements 22 are applied as light control portions 100.

FIG. 12 is a plan view showing the sub-pixels SP to be observed from viewpoint 1 when lenses 61 are applied as the light control portions 100.

DETAILED DESCRIPTION

Figure 2:
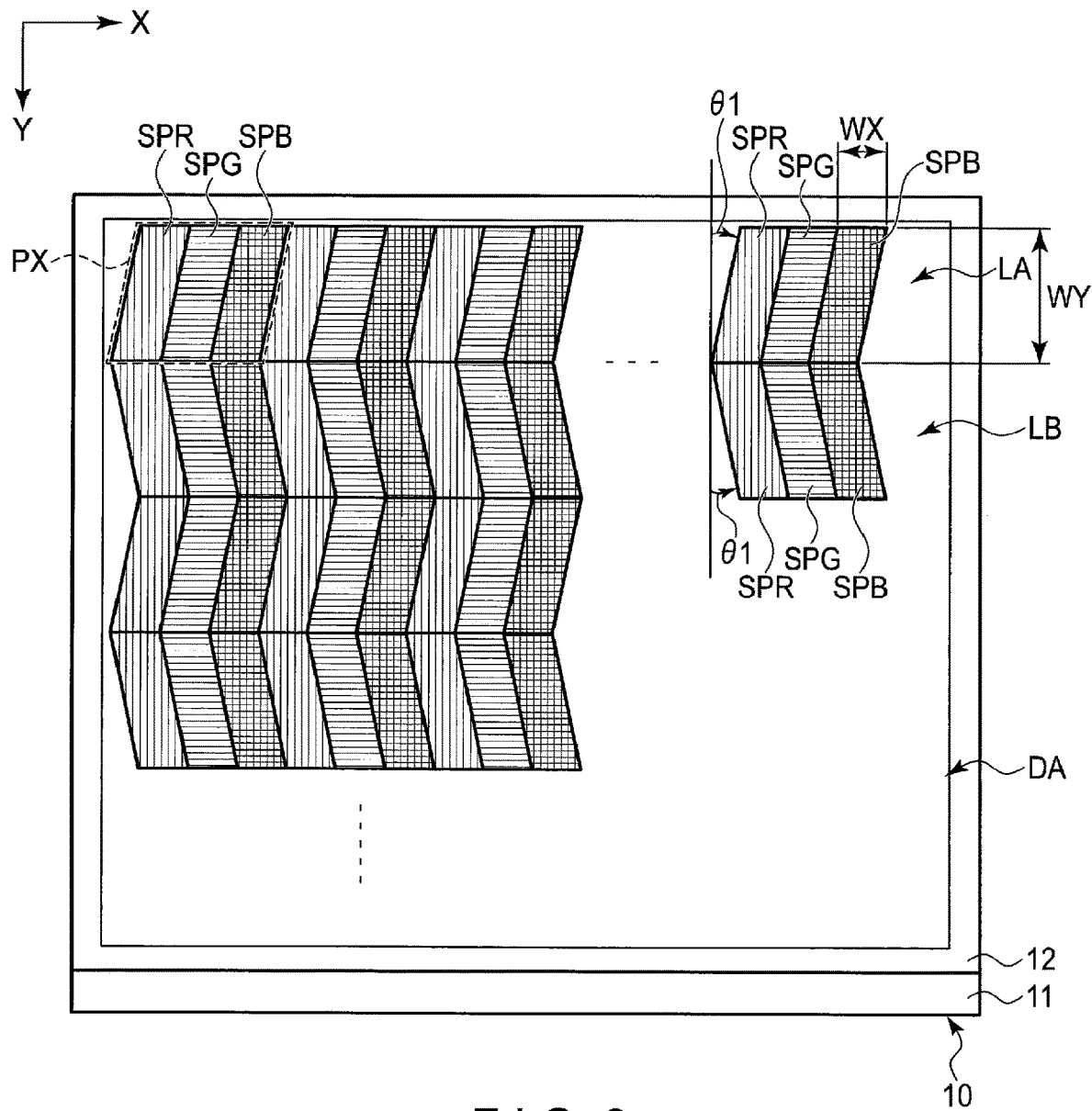
FIG. 2 is a plan view showing a configuration example of a display panel 10 shown in FIG. 1.

In general, according to one embodiment, a display device comprising: a display portion comprising sub-pixels arranged in a first direction and a second direction orthogonal to the first direction, the sub-pixels adjacent to each other in the first direction displaying colors different from each other, the sub-pixels adjacent to each other in the second direction displaying a same color; and a light control portion overlapping the display portion, wherein: the display portion includes a red sub-pixel, a green sub-pixel, and a blue sub-pixel, each of the red sub-pixel, the green sub-pixel, and the blue sub-pixel is shaped in a parallelogram, and inclined at a first angle of greater than or equal to 4° and less than or equal to 16° with respect to the second direction, the light control portion is inclined at a second angle substantially equivalent to arctan(2/9) with respect to the second direction.

According to another embodiment, a display method of a display device comprising: a display portion comprising sub-pixels arranged in a first direction and a second direction orthogonal to the first direction, the sub-pixels adjacent to each other in the first direction displaying colors different from each other, the sub-pixels adjacent to each other in the second direction displaying a same color; and a light control portion overlapping the display portion, the display portion including a red sub-pixel, a green sub-pixel, and a blue sub-pixel, each of the red sub-pixel, the green sub-pixel, and the blue sub-pixel being shaped in a parallelogram, and inclined at a first angle of greater than or equal to 4° and less than or equal to 16° with respect to the second direction, the light control portion being inclined at a second angle substantially equivalent to arctan(2/9) with respect to the second direction, wherein: the sub-pixels adjacent to each other in the first direction display images identified when the display portion is observed from different viewpoints, of the viewpoints arranged in order in an observation plane; the sub-pixels in a first row display images corresponding to viewpoints represented as (3n−2), where n is an integer greater than or equal to 1; the sub-pixels in a second row display images corresponding to viewpoints represented as (3n); and the sub-pixels in a third row display images corresponding to viewpoints represented as (3n−1).

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In addition, in the specification and drawings, structural elements which function in the same or a similar manner to those described in connection with preceding drawings are denoted by like reference numbers, and redundant detailed description thereof is omitted unless necessary.

First Configuration Example

FIG. 1 is a cross-sectional view showing a first configuration example of a display device 1 of the present embodiment. In the drawing, a first direction X and a second direction Y are orthogonal to each other, and a third direction Z is orthogonal to the first direction X and the second direction Y. In the present specification, a direction toward a pointing end of an arrow indicating the third direction Z is referred to as "upper" or "above", and a direction toward the opposite side from the pointing end of the arrow is referred to as "lower" or "below". When such expressions as "a second member above a first member" and "a second member below a first member" are used, the second member may be in contact with the first member or may be separated from the first member. Further, it is assumed that an observation position at which the display device 1 is to be observed is at the pointing end side of the arrow indicating the third direction Z, and observing from the observation position toward an X-Y plane defined by the first direction X and the second direction Y is called a planar view.

The display device 1 comprises a display panel 10, a light control device 20, and an illumination device 30. The display panel 10 is, for example, a liquid crystal panel. The display panel 10 comprises a first substrate 11 and a second substrate 12. The second substrate 12 is located above the first substrate 11. The light control device 20 is located above the display panel 10. Although details will be described later, the light control device 20 comprises a plurality of light control portions. The light control device 20 is fixed to the display panel 10 by a transparent resin 40. The illumination device 30 is located below the display panel 10. A first polarizer 51 is bonded to a lower surface 11B of the first substrate 11. A second polarizer 52 is bonded to an upper surface 20A of the light control device 20.

Alternatively, the second polarizer 52 may be bonded to an upper surface 12A of the second substrate 12, or bonded to a lower surface 20B of the light control device 20. Further, the light control device 20 may be located between the first polarizer 51 and the first substrate 11. Furthermore, the light control device 20 may be incorporated in the display panel 10.

FIG. 2 is a plan view showing a configuration example of the display panel 10 shown in FIG. 1. The display panel 10 comprises a display portion DA at a portion where the first substrate 11 and the second substrate 12 overlap one another in planar view. The display portion DA comprises a plurality of sub-pixels SP arrayed in the first direction X and the second direction Y. In one example, as the sub-pixels SP, the display portion DA comprises a red sub-pixel SPR which displays red, a green sub-pixel SPG which displays green, and a blue sub-pixel SPB which displays blue. In FIG. 2, the red sub-pixel SPR is shown by a pattern including vertical lines parallel to the second direction Y, the green sub-pixel SPG is shown by a pattern including horizontal lines parallel to the first direction X, and the blue sub-pixel SPB is shown by a lattice pattern. In the following explanation, when the color of the sub-pixel is not particularly referred to, the sub-pixel may be simply referred to as the sub-pixel SP. The first direction X may be referred to as a horizontal direction, and the second direction Y may be referred to as a vertical direction. The sub-pixels SP arranged in the first direction X form row, and the sub-pixels SP arranged in the second direction Y form column.

The sub-pixels SP adjacent to each other in the first direction X are sub-pixels displaying colors different from each other. The sub-pixels SP adjacent to each other in the second direction Y are sub-pixels displaying the same color. For example, the red sub-pixel SPR, the green sub-pixel SPG, and the blue sub-pixel SPB are arranged in this order in the first direction X, and constitute a main pixel PX. The main pixels PX are arranged in the first direction X and the second direction Y.

The red sub-pixel SPR, the green sub-pixel SPG, and the blue sub-pixel SPB are each formed as a parallelogram, and inclined at a first angle θ1 of greater than or equal to 4° and less than or equal to 16° with respect to the second direction Y. Further, the red sub-pixel SPR, the green sub-pixel SPG, and the blue sub-pixel SPB each have the same dimension, and have a width WX along the first direction X and a width WY along the second direction Y. For example, the width WY is approximately three times larger than the width WX.

In the display portion DA, the sub-pixels SP located in an odd-numbered row LA are inclined in a direction different from the sub-pixels SP located in an even-numbered row LB. However, the angle formed by the sub-pixel SP located in the odd-numbered row LA with respect to the second direction Y is the same as the angle formed by the sub-pixel SP located in the even-numbered row LB with respect to the second direction Y.

For example, the sub-pixels SP located in the odd-numbered row LA are all inclined clockwise at the first angle θ1 with respect to the second direction Y. Meanwhile, the sub-pixels SP located in the even-numbered row LB are all inclined counterclockwise at the first angle θ1 with respect to the second direction Y. Note that the sub-pixels SP located in the odd-numbered row LA may be inclined counterclockwise at the first angle θ1 with respect to the second direction Y, and the sub-pixels SP located in the even-numbered row LB may be inclined clockwise at the first angle θ1 with respect to the second direction Y.

FIG. 3 is a cross-sectional view showing a configuration example of the light control device 20 shown in FIG. 1. The light control device 20 comprises a base 21, and a plurality of light restriction elements 22. The base 21 is a transparent substrate formed of glass or resin, etc. The light restriction element 22 restricts light beams entering the light restriction element 22, and serves as a light control portion. In one example, the light restriction element 22 comprises a light shield element 23 overlapping the sub-pixels SP arranged in the first direction X, and an aperture 24 overlapping at least one sub-pixel SP. In other words, a plurality of light shield elements 23 are arranged in the first direction X at intervals corresponding to the aperture 24. The optical density (OD value) of the light shield element 23 should preferably be 3 or more. The light shield element 23 may be formed of a metal material such as a compound containing chromium, molybdenum, or silver, or may be formed of a black resin material. In the present embodiment, as the light restriction element 22, for example, an emulsion mask is used.

The light shield element 23 has a width W23, and the aperture 24 has a width W24. Note that each of the width W23 and the width W24 is a length along the first direction X. A width W22 of one light restriction element 22 or a pitch of light restriction elements 22 corresponds to the sum of the width W23 and the width W24.

The width W23 is greater than the width W24. The light shield element 23 overlaps, for example, twenty-two sub-pixels SP. The aperture 24 overlaps, for example, one sub-pixel SP. The apertures 24 which are adjacent to each other in the first direction X overlap the sub-pixels SP of different colors. For example, the aperture 24 located on the left side in FIG. 3 overlaps the red sub-pixel SPR, and the aperture 24 located on the right side in FIG. 3 overlaps the blue sub-pixel SPB.

In the example illustrated in FIG. 3, although the width W24 is greater than the width WX of the sub-pixel SP, the size of the width is not limited to this example. The width W24 may be equal to the width WX, or the width W24 may be less than the width WX. When the width W24 is less than the width WX, the number of light beams transmitted through the light restriction element 22 can be reduced, and the resolution of an image to be viewed can be improved. Meanwhile, from the standpoint of suppressing reduction in luminance of the image to be viewed, the width W24 should preferably be substantially equal to the width WX, which is the width of at least one sub-pixel.

FIG. 4 is a plan view showing a configuration example of the light control device 20 shown in FIG. 3.

The light control device 20 comprises the light restriction elements 22 arranged in the first direction X. The light shield element 23 and the aperture 24 which constitute the light restriction element 22 extend in a direction different from the first direction X and the second direction Y. Each of the light shield elements 23 includes a pair of edges E23 arranged in the first direction X. The edges E23 are parallel to each other. The aperture 24 is located between the edges E23, which are opposed to each other, of the light shield elements 23 that are adjacent to each other in the first direction X.

The light restriction elements 22 overlap the display portion DA shown in FIG. 2, and linearly extend over the sub-pixels SP located in the odd-numbered rows LA and the sub-pixels SP located in the even-numbered rows LB. Each of the light restriction element 22, the light shield element 23, and the aperture 24 is inclined at a second angle θ2 with respect to the second direction Y. The second angle θ2 is smaller than the first angle θ1. In the present embodiment, an extending direction of each of the light restriction element 22, the light shield element 23, and the aperture 24 can be defined as an extending direction of the edge E23. Each of the edges E23 is inclined at the second angle θ2 (about 12.5°), which is substantially equivalent to arctan(2/9) with respect to the second direction Y. Note that the second angle θ2 intended in this specification may be an angle formed clockwise with respect to the second direction Y, or may be an angle formed counterclockwise with respect to the second direction Y.

According to the first configuration example of the present embodiment, the light control device 20 overlaps the display panel 10 comprising the display portion DA shown in FIG. 2, and moreover, comprises the light restriction elements 22 (the light control portions), which are inclined at the second angle θ2 substantially equivalent to arctan(2/9), with respect to the sub-pixels SP inclined at the first angle θ1 of greater than or equal to 4° and less than or equal to 16°. By defining the above first angle θ1 and the second angle θ2, occurrence of a moiré between regularly arranged sub-pixels SP and regularly arranged light restriction elements 22 can be suppressed, and the resolution can be improved.

Second Configuration Example

FIG. 5 is a cross-sectional view showing a second configuration example of the display device 1 of the present embodiment. The display device 1 shown in FIG. 5 comprises a light control device 60 different from the light control device 20 of the display device 1 shown in FIG. 1. The light control device 60 comprises a plurality of lenses 61. The light control device 60 includes a lens surface 60A and a flat surface 60B. The flat surface 60B of the light control device 60 is fixed to the second polarizer 52 by the transparent resin 40. The second polarizer 52 is bonded to the upper surface 12A of the second substrate 12. Details of the light control device 60 will be described later.

Third Configuration Example

FIG. 6 is a cross-sectional view showing a third configuration example of the display device 1 of the present embodiment. The display device 1 shown in FIG. 6 is different from the display device 1 shown in FIG. 5 in that the position of the light control device 60 is different. More specifically, the lens surface 60A of the light control device 60 is in contact with the second substrate 12. Preferably, the light control device 60 should be fixed to an outer circumference of the display panel 10 though not described in detail. The second polarizer 52 is bonded to the flat surface 60B of the light control device 60. Details of the light control device 60 will be described later.

Figure 7:
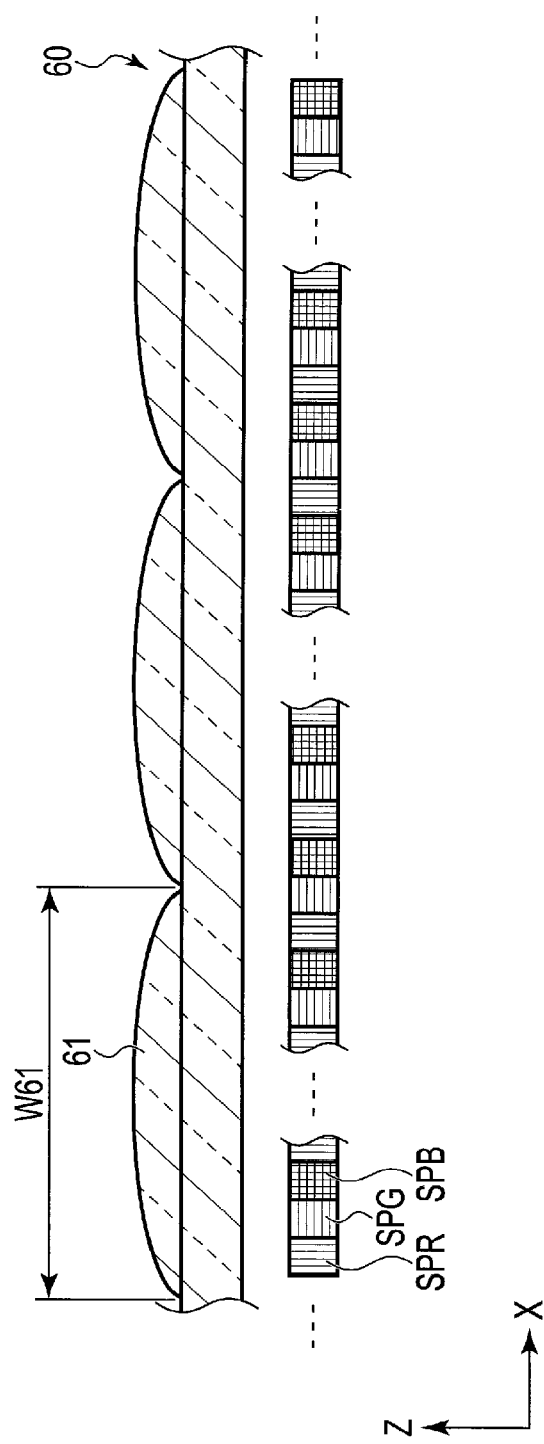
FIG. 7 is a cross-sectional view showing a configuration example of a light control device 60 shown in FIGS. 5 and 6.

FIG. 7 is a cross-sectional view showing a configuration example of the light control device 60 shown in FIGS. 5 and 6. The light control device 60 comprising a plurality of lenses 61 is formed of, for example, transparent glass or resin. The lenses 61 function as light control portions. The lenses 61 overlap a plurality of sub-pixels SP arranged in the first direction X. Each of the lenses 61 has a width W61 along the first direction X. The lens 61 overlaps, for example, twenty-three sub-pixels SP.

Figure 8:
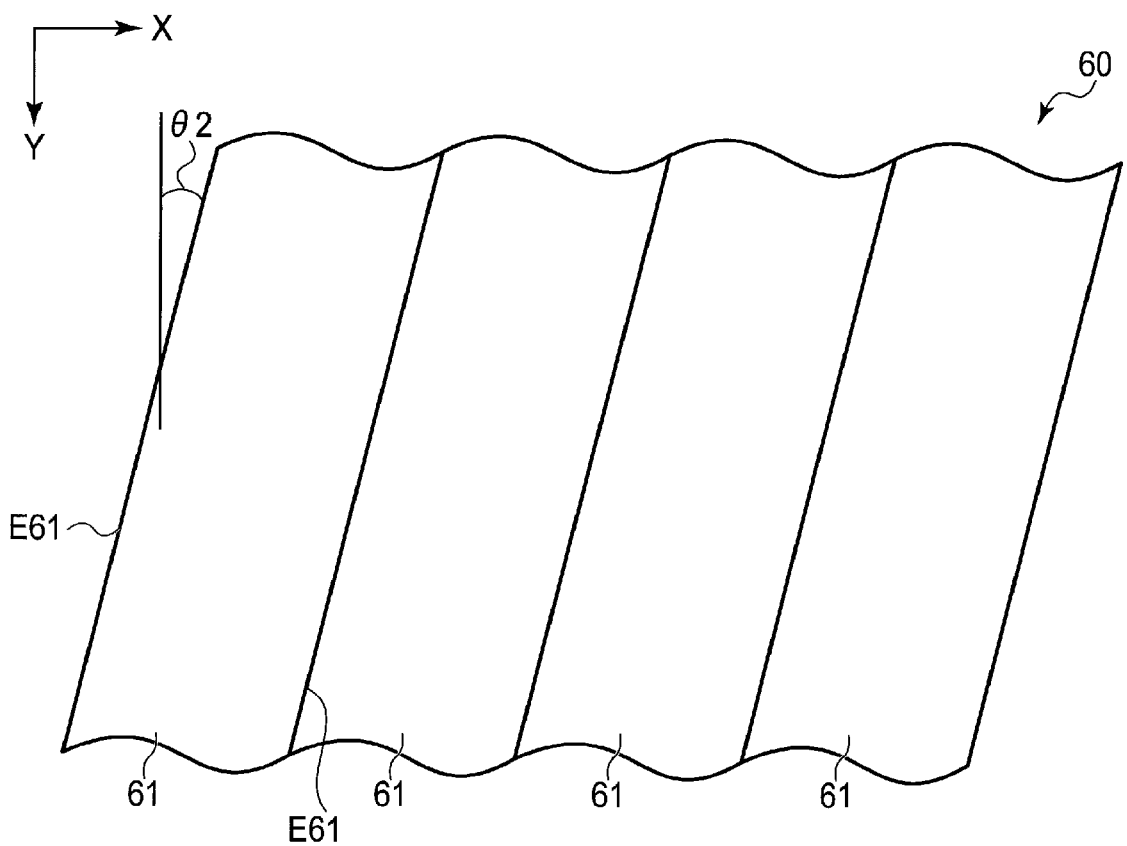
FIG. 8 is a plan view showing a configuration example of the light control device 60 shown in FIGS. 5 and 6.

FIG. 8 is a plan view showing a configuration example of the light control device 60 shown in FIGS. 5 and 6. In the light control device 60, the lenses 61 are arranged in the first direction X. Each of the lenses 61 extends in a direction different from the first direction X and the second direction Y. Each of the lenses 61 includes a pair of edges E61 arranged in the first direction X. The edges E61 are parallel to each other.

The lenses 61 overlap the display portion DA shown in FIG. 2, and linearly extend over the sub-pixels SP located in the odd-numbered rows LA and the sub-pixels SP located in the even-numbered rows LB. As in the first configuration example, the lenses 61 are inclined at the second angle θ2 with respect to the second direction Y. In the present embodiment, an extending direction of each of the lenses 61 can be defined as an extending direction of the edges E61. Each of the edges E61 is inclined at the second angle θ2, which is substantially equivalent to arctan(2/9) with respect to the second direction Y.

According to the second configuration example and the third configuration example of the present embodiment, the light control device 60 overlaps the display panel 10 comprising the display portion DA shown in FIG. 2, and moreover, comprises the lenses 61 (the light control portions), which are inclined at the second angle θ2 substantially equivalent to arctan(2/9), with respect to the sub-pixels SP inclined at the first angle θ1 of greater than or equal to 4° and less than or equal to 16°. By defining the above first angle θ1 and the second angle θ2, the same advantage as that of the first configuration example can be obtained.

<Specific Example of Light Control>

The light restriction element 22 and the lens 61 will be described below as a light control portion 100.

Figure 9:
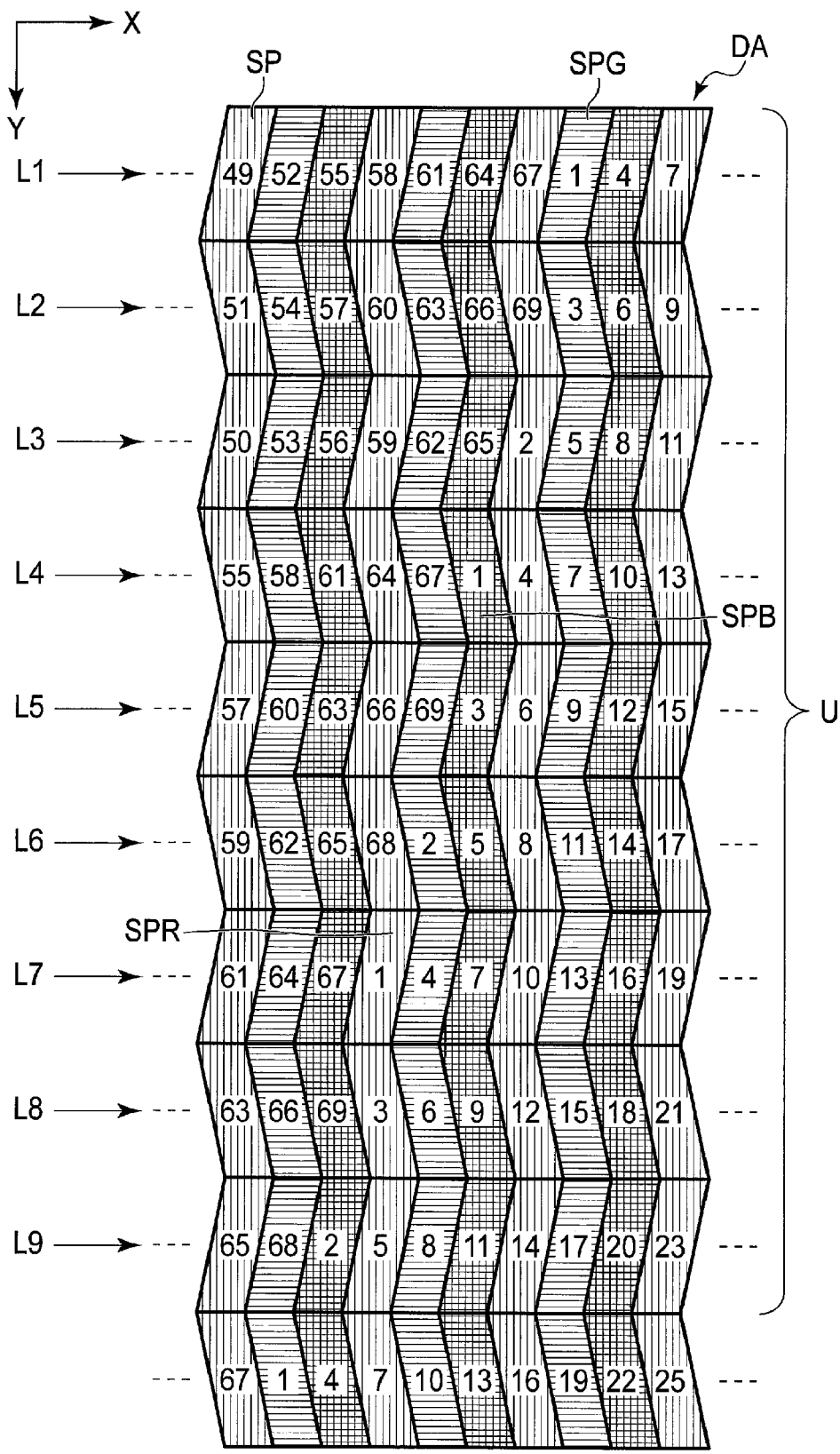
FIG. 9 is an illustration showing an example of a layout of sub-pixels SP in a display portion DA.

FIG. 9 is an illustration showing an example of a layout of the sub-pixels SP in the display portion DA. FIG. 10 is an illustration showing the relationship between a viewpoint in a virtual observation plane VP and the sub-pixels SP to be observed. A unit matrix U comprises a plurality of sub-pixels SP arrayed in a matrix in the first direction X and the second direction Y. In the unit matrix U, in one example, twenty-three sub-pixels SP are arranged in the first direction X, and nine sub-pixels SP are arranged in the second direction Y. In other words, the unit matrix U comprises two hundred and seven (23*9=207) sub-pixels SP.

The numbers assigned to the respective sub-pixels SP in FIG. 9 correspond to the numbers assigned to the viewpoints arranged in order counterclockwise in the observation plane VP shown in FIG. 10. In one example, sixty-nine viewpoints exist in the observation plane VP. In FIG. 9, the sub-pixels SP indicated by the same number are observed from the same viewpoint. In three rows arranged continuously in the second direction Y, the unit matrix U comprises sixty-nine (23*3=69) sub-pixels SP in total. These sixty-nine sub-pixels SP are observed from different viewpoints, respectively. In other words, the sixty-nine sub-pixels SP are observed from sixty-nine viewpoints, respectively.

For example, in the first row L1 shown in FIG. 9, the sub-pixels SP observed from the viewpoints represented as (3n−2), where n is an integer greater than or equal to 1, are arranged. In the second row L2, the sub-pixels SP observed from the viewpoints represented as (3n) are arranged. In the third row L3, the sub-pixels SP observed from the viewpoints represented as (3n−1) are arranged. The fourth row L4 and the seventh row L7 comprise the sub-pixels SP arranged similarly to the first row L1. The fifth row L5 and the eighth row L8 comprise the sub-pixels SP arranged similarly to the second row L2. The sixth row L6 and the ninth row L9 comprise the sub-pixels SP arranged similarly to the third row L3.

Each of the sub-pixels SP in the first row L1, the fourth row L4, and the seventh row L7 displays an image corresponding to the viewpoint represented as (3n−2). Each of the sub-pixels SP in the second row L2, the fifth row L5, and the eighth row L8 displays an image corresponding to the viewpoint represented as (3n). Each of the sub-pixels SP in the third row L3, the sixth row L6, and the ninth row L9 displays an image corresponding to the viewpoint represented as (3n−1).

In the sub-pixels SP of the three consecutive rows, one of the red sub-pixel SPR, the green sub-pixel SPG, and the blue sub-pixel SPB to be observed from the same viewpoint is included. Further, in order to realize color display at the same viewpoint, a set of all of the red sub-pixel SPR, the green sub-pixel SPG, and the blue sub-pixel SPB is included in the sub-pixels SP of the nine consecutive rows.

More specifically, as regards the sub-pixels to be observed from the same viewpoint, the sub-pixel of a first color is included in one of the rows from the first row L1 to the third row L3, and the sub-pixel of a second color different from the first color is included in one of the rows from the fourth row L4 to the sixth row L6, and the sub-pixel of a third color different from the first color and the second color is included in one of the rows from the seventh row L7 to the ninth row L9. In one example, when the display portion DA is observed from viewpoint 1, the green sub-pixel SPG is included in the first row L1, the blue sub-pixel SPB is included in the fourth row L4, and the red sub-pixel SPR is included in the seventh row L7.

In FIG. 10, visual lines (i.e., lines of sight) V1 to V67 are depicted. Visual lines V1 to V67 may be assumed as light beams restricted by the light control portions 100. Visual lines V1 to V67 are line segments connecting between viewpoints 1 to 67 and the sub-pixels SP of the first row L1, respectively, when the viewer's eye is assumed to be at the corresponding viewpoint in the observation plane VP.

Note that viewpoints 2 and 3 that are not illustrated exist between viewpoints 1 and 4 in the observation plane VP. Also, visual lines V2 and V3 that are not illustrated exist between visual lines V1 and V4. Visual line V2 is a line segment connecting between viewpoint 2 and the sub-pixel SP indicated as "2" in the third row L3. Visual line V3 is a line segment connecting between viewpoint 3 and the sub-pixel SP indicated as "3" in the second row L2. As described above, sixty-nine viewpoints 1 to 69 exist in the observation plane VP, sixty-nine sub-pixels SP indicated as "1" to "69" exist in the display portion DA, and sixty-nine visual lines V1 to V69 exist between the observation plane VP and the display portion DA.

The twenty-three sub-pixels SP arranged in the first direction X display images when the display portion DA is observed from the viewpoints corresponding to these sub-pixels. The viewer who is present at the observation plane VP can view the sub-pixel SP through one of the visual lines V1 to V69 when the display portion DA is observed through the light control portions 100. The viewpoint in the observation plane VP is different in the right eye and the left eye of the viewer. Accordingly, the viewer can recognize a parallax as a result of different images being observed at different viewpoints, and a stereoscopic effect of the image can be obtained. Further, when the viewer changes the viewpoint along the observation plane VP, images according to the sixty-nine viewpoints can be observed, respectively, and more natural stereoscopic effect can be obtained.

FIG. 11 is a plan view showing the sub-pixels SP to be observed when the light restriction elements 22 are applied as the light control portions 100. The light control device 20 overlaps the unit matrix U. The aperture 24 in the light restriction elements 22 extends linearly over the sub-pixels SP from the first row L1 to the ninth row L9.

In the example illustrated in FIG. 11, in the sub-pixel SP, when the width WX is assumed as 1, the width WY is 3. The first angle θ1 is 15°, and the second angle θ2 is 12.5°. In a state in which the light control device 20 overlaps the unit matrix U, the aperture 24 overlaps each of the green sub-pixel SPG indicated as "1", the blue sub-pixel SPB indicated as "1", and the red sub-pixel SPR indicated as "1". Accordingly, when the display portion DA is observed from viewpoint 1 shown in FIG. 10, the green sub-pixel SPG, the blue sub-pixel SPB, and the red sub-pixel SPR corresponding to this viewpoint can be observed.

FIG. 12 is a plan view showing the sub-pixels SP to be observed when the lenses 61 are applied as the light control portions 100. Each of the lenses 61 extends linearly over the sub-pixels SP from the first row L1 to the ninth row L9.

In the example illustrated in FIG. 12, in the sub-pixel SP, when the width WX is assumed as 1, the width WY is 3. The first angle θ1 is 15°, and the second angle θ2 is 12.5°. In a state in which the light control device 20 overlaps the unit matrix U, the green sub-pixel SPG, the blue sub-pixel SPB, and the red sub-pixel SPR, which are all indicated as "1", are located on the same straight line parallel to the extending direction of the lens 61. Accordingly, when the display portion DA is observed from viewpoint 1 shown in FIG. 10, the green sub-pixel SPG, the blue sub-pixel SPB, and the red sub-pixel SPR corresponding to this viewpoint can be observed.

Figure 13:
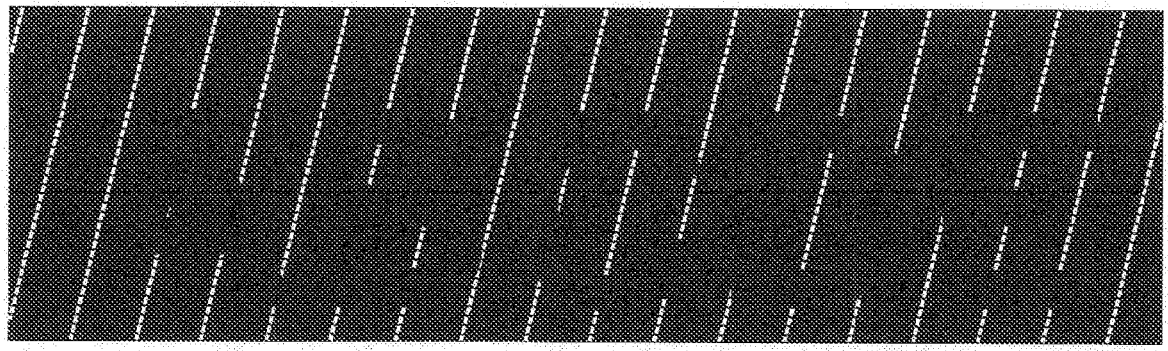
FIG. 13 is an illustration showing a display example of a display device of a comparative example.
Figure 14:
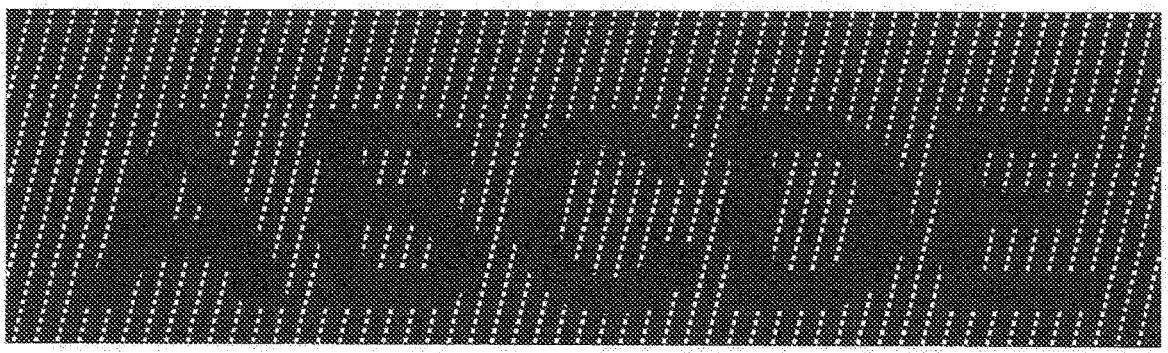
FIG. 14 is an illustration showing a display example of the display device 1 of the present embodiment.

FIG. 13 is an illustration showing a display example of a display device of a comparative example. FIG. 14 is an illustration showing a display example of the display device 1 of the present embodiment.

The comparative example shown in FIG. 13 corresponds to an example in which a display portion DA of a layout disclosed in FIG. 7 of JP 2005-316372 A overlaps the light control portions 100 of the present embodiment. Although the display portion DA displays a character string "ABODE", when the display portion DA is observed through the light control portions 100, it is difficult to recognize that character string.

According to the present embodiment shown in FIG. 14, when the display portion DA is observed through the light control portions 100, the character string "ABODE" displayed on the display portion DA can be recognized, and a moire did not occur.

As explained above, according to the present embodiment, a display device and a display method capable of improving display quality can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. For example, some structural elements may be deleted from the entire structural elements in the embodiments. Furthermore, structural elements described in different embodiments may be combined suitably.

An example of a display device which can be obtained from the structure disclosed in the present specification is noted as follows:

(1) A display device comprising:
a display portion comprising sub-pixels arranged in a first direction and a second direction orthogonal to the first direction, the sub-pixels adjacent to each other in the first direction displaying colors different from each other, the sub-pixels adjacent to each other in the second direction displaying a same color; and
a light control portion overlapping the display portion, in which:
the display portion includes a red sub-pixel, a green sub-pixel, and a blue sub-pixel,
each of the red sub-pixel, the green sub-pixel, and the blue sub-pixel is shaped in a parallelogram, and inclined at a first angle of greater than or equal to 4° and less than or equal to 16° with respect to the second direction,
the light control portion is inclined at a second angle substantially equivalent to arctan(2/9) with respect to the second direction.

(2) The display device according to (1), in which the light control portion is a light restriction element or a lens,
the light restriction element comprises a light shield element overlapping the plurality of sub-pixels arranged in the first direction, and an aperture overlapping at least one of the sub-pixels,
the lens overlaps the plurality of sub-pixels arranged in the first direction.

(3) The display device according to (1) or (2), in which in the display portion, the sub-pixels of one of an odd-numbered row and an even-numbered row are inclined clockwise at the first angle with respect to the second direction, and the sub-pixels of the other one of the odd-numbered row and the even-numbered row are inclined counterclockwise at the first angle with respect to the second direction.

(4) The display device according to (3), in which the light control portion is linearly extended over the sub-pixel in the odd-numbered row and the sub-pixel in the even-numbered row.

(5) The display device according to any one of (1) to (4) comprising:
a display panel comprising the display portion; and
a light control device comprising the light control portions arranged in the first direction.

(6) A display method of a display device comprising:
a display portion comprising sub-pixels arranged in a first direction and a second direction orthogonal to the first direction, the sub-pixels adjacent to each other in the first direction displaying colors different from each other, the sub-pixels adjacent to each other in the second direction displaying the same color; and
a light control portion overlapping the display portion,
the display portion including a red sub-pixel, a green sub-pixel, and a blue sub-pixel,
each of the red sub-pixel, the green sub-pixel, and the blue sub-pixel being shaped in a parallelogram, and inclined at a first angle of greater than or equal to 4° and less than or equal to 16° with respect to the second direction,
the light control portion being inclined at a second angle substantially equivalent to arctan(2/9) with respect to the second direction, in which:
the sub-pixels adjacent to each other in the first direction display images identified when the display portion is observed from different viewpoints, of the viewpoints arranged in order in an observation plane;
the sub-pixels in a first row display images corresponding to viewpoints represented as (3n−2), where n is an integer greater than or equal to 1;
the sub-pixels in a second row display images corresponding to viewpoints represented as (3n); and
the sub-pixels in a third row display images corresponding to viewpoints represented as (3n−1).

What is claimed is:
1. A display device comprising:
a display panel comprising a display portion comprising sub-pixels arranged in a first direction and a second direction orthogonal to the first direction, the sub-pixels adjacent to each other in the first direction displaying colors different from each other, the sub-pixels adjacent to each other in the second direction displaying a same color;
a light control device comprising light restriction elements arranged in the first direction and overlapping the display portion;
a transparent resin that fixes the light control device to the display panel; and
a polarizer bonded to an upper surface of the light control device, wherein:
the light restriction elements are located on a lower surface of the light control device, and include a light shield element overlapping twenty-two sub-pixels arranged in the first direction and an aperture overlapping one of the sub-pixels arranged in the first direction,
in the display portion, sixty-nine sub-pixels constituting a unit matrix of three rows arranged continuously in the second direction and twenty-three columns arranged continuously in the first direction are configured to display images identified when the display portion is observed from different viewpoints, of sixty-nine viewpoints arranged in order in an observation plane,
three unit matrices arranged continuously in the second direction include one red sub-pixel, one green sub-pixel, and one blue sub-pixel as sub-pixels observed from a same viewpoint at a position overlapping the aperture,
the sub-pixel of a first color observed from the same viewpoint is included in one of first to third rows, the sub-pixel of a second color different from the first color is included in one of fourth to sixth rows, and the sub-pixel of a third color different from the first color and the second color is included in one of seventh to ninth rows,
each of the red sub-pixel, the green sub-pixel, and the blue sub-pixel is shaped in a parallelogram, and inclined at a first angle of greater than or equal to 4° and less than or equal to 16° with respect to the second direction, the aperture is linearly extended over the sub-pixel in an odd-numbered row and the sub-pixel in an even-numbered row and is inclined at a second angle substantially equivalent to arctan(2/9) with respect to the second direction, and when n is an integer greater than or equal to 1, the sub-pixels in the first, fourth, and seventh rows overlapping the aperture are sub-pixels of different colors from each other, and configured to display images corresponding to a same viewpoint represented as (3n−2), the sub-pixels in the second, fifth, and eighth rows overlapping the aperture are sub-pixels of different colors from each other, and configured to display images corresponding to a same viewpoint represented as (3n), and the sub-pixels in the third, sixth, and ninth rows overlapping the aperture are sub-pixels different colors from each other, and configured to display images corresponding to a same viewpoint represented as (3n−1).

2. The display device according to claim 1, wherein in the display portion, the sub-pixels of one of an odd-numbered row and an even-numbered row are inclined clockwise at the first angle with respect to the second direction, and the sub-pixels of the other one of the odd-numbered row and the even-numbered row are inclined counterclockwise at the first angle with respect to the second direction.

3. The display device according to claim 1, wherein a width of the aperture is less than or equal to a width of the sub-pixel in the first direction.

* * * * *